Nov. 20, 1923. 1,475,120
G. JOHNSON
AUTOMATIC RAIN WATER VALVE MECHANISM
Filed May 22, 1922  2 Sheets-Sheet 1
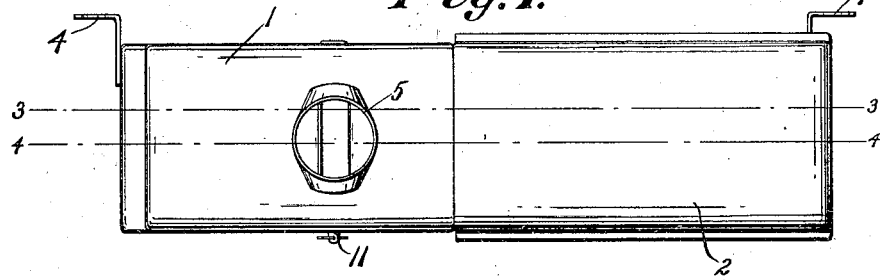
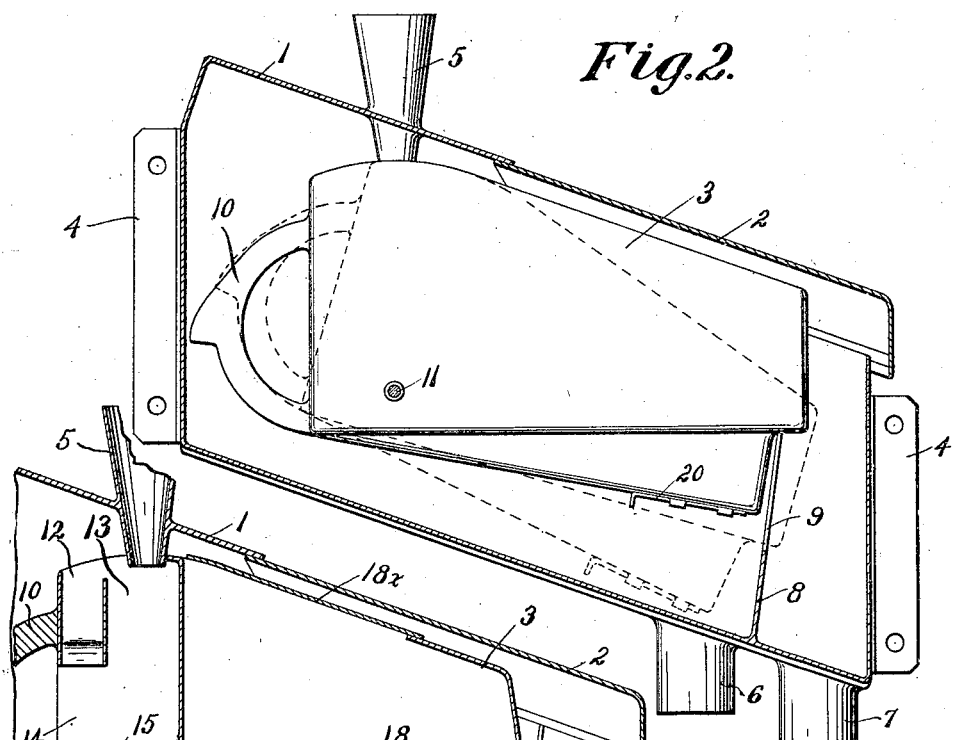
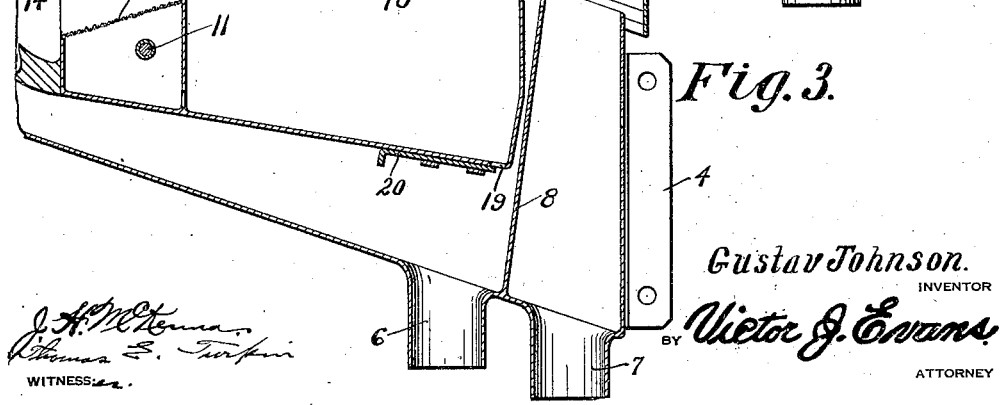

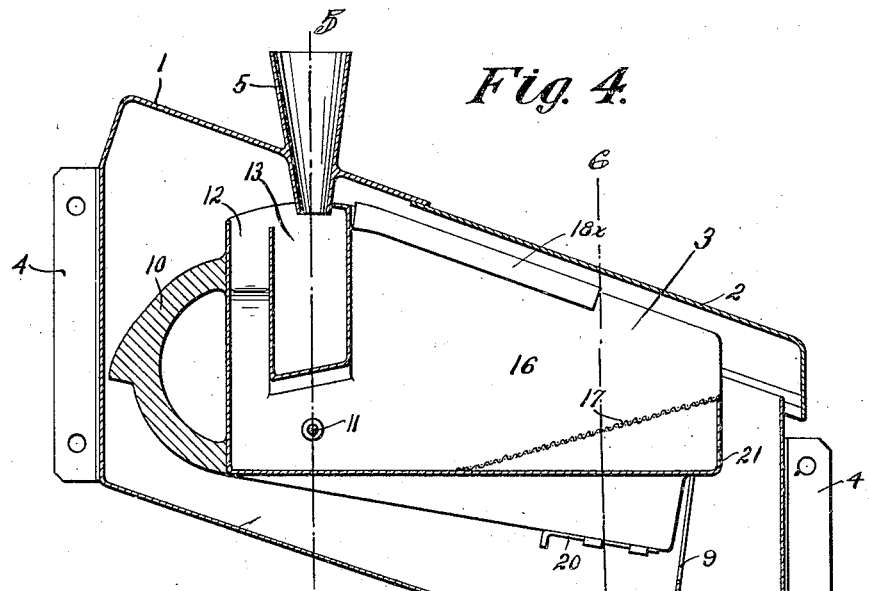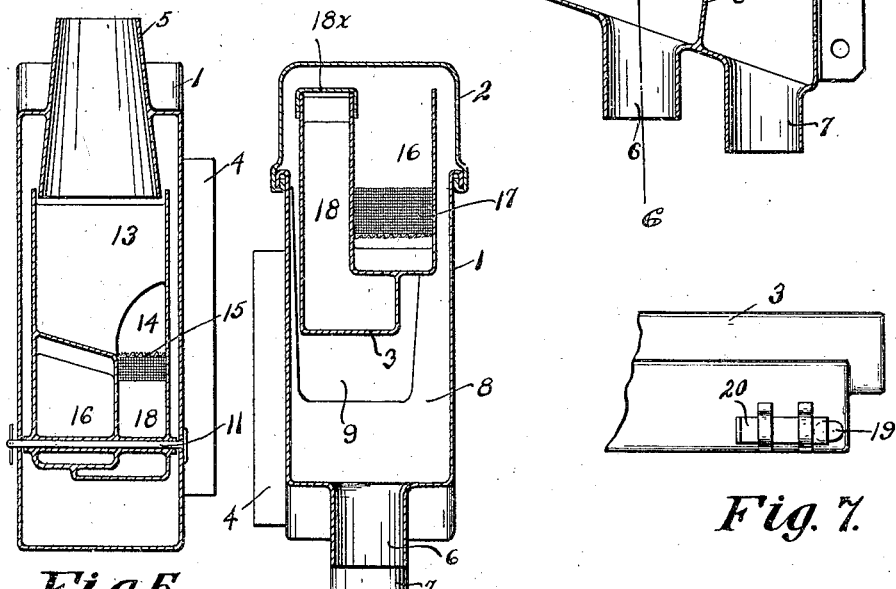

Patented Nov. 20, 1923.

1,475,120

UNITED STATES PATENT OFFICE.

GUSTAV JOHNSON, OF MAYVILLE, NORTH DAKOTA.

AUTOMATIC RAIN-WATER VALVE MECHANISM.

Application filed May 22, 1922. Serial No. 562,874.

*To all whom it may concern:*

Be it known that I, GUSTAV JOHNSON, a citizen of the United States, residing at Mayville, in the county of Traill and State of North Dakota, have invented new and useful Improvements in Automatic Rain-Water Valve Mechanism, of which the following is a specification.

The object of my said invention is the provision of a simple and reliable valve mechanism constructed and arranged to automatically eliminate the first run of water incident to a rainfall and then bring about the supply of the following water to a cistern or other storage tank.

To the attainment of the foregoing, the invention consists in the improvement as hereinafter described and definitely claimed.

In the accompanying drawings, forming part of this specification:—

Figure 1 is a view in plan of my novel valve mechanism.

Figure 2 is an elevation of the mechanism as it appears with one side of the casing removed.

Figure 3 is a longitudinal vertical section taken in the plane indicated by the line 3—3 of Figure 1.

Figure 4 is a longitudinal vertical section taken in the plane indicated by the line 4—4 of Figure 1.

Figures 5 and 6 are transverse sections taken in the planes indicated by the lines 5—5 and 6—6, respectively, of Figure 4.

Figure 7 is a detail view illustrative of the means for regulating the outlet at the bottom of the lower compartment of the swinging member of the valve mechanism.

Similar numerals of reference designate corresponding parts in all of the views of the drawings.

The casing 1 of my novel mechanism may be and preferably is formed of tin in the configuration illustrated, and in the preferred embodiment of the invention the said casing 1 is provided with a removable cover section 2 so as to facilitate the placing of the vertically swinging member 3 in the casing and the removal of said member 3 when it is necessary to make repairs. Manifestly it is within the purview of my invention to hold the removable cover section 2 on the casing 1 in any approved manner and it is also within the purview of my invention to entirely dispense with the removable cover section 2. At 4 the casing 1 is provided with apertured flanges to facilitate the attachment of the casing to a support, and at 5 the casing 1 is provided with an intake conduit, said conduit 5 being designed to be connected with a downspout. The intake conduit 5 is arranged adjacent to the uppermost corner of the casing 1, the said casing 1 being preferably inclined to a slight extent as illustrated. Leading from the bottom of the casing 1 near the lowermost and forward corner thereof are outlet spouts 6 and 7. In the casing 1 and arranged between the outlet spouts 6 and 7 is a transverse partition wall 8 which is recessed as indicated by 9 for the reception and vertical play of the forward end of the vertically swinging member 3.

The vertically swinging member 3 is entirely enclosed in the casing 1 and is preferably shaped in side elevation and plan as illustrated. At its rear end the said member 3 is provided with a weight 10 which tends to normally retain the member in the position shown in Figure 2. It will also be noticed that the member 3 is mounted to swing on a transverse shaft 11, carried and detachably secured by preference in the side wall of the casing 1. In common with the casing 1 the major portion of the member 3 is formed of tin or other appropriate sheet metal; and it will be noted that the said member 3 is provided with the following features, viz; a rear upright conduit 12, an upright conduit 13 immediately in front of the conduit 12, an outlet 14 leading rearwardly from the conduit 13 and under one side of the conduit 12 and having an inclined screen 15 in its bottom, a longitudinal conduit 16 extending to the forward end of the member 3 and having in its forward portion a screen 17 and also having its rear portion extending under the upright conduit 13 and communicating with the lower end of the conduit 12, and a pocket 18 arranged alongside the longitudinal conduit 16 and extending under said conduit 16 but not communicating therewith having its rear portion extended under the before mentioned screen 15. The said screens 15 and 17 are preferably of fine wire mesh, and it will also be noted that in its bottom and near its forward end the pocket 18 is provided with a discharge aperture 19, the size of which is adapted to be regulated by a slidable valve plate 20.

In virtue of the construction described, it will be understood that the first run of rain water received from the intake conduit 4 will, because of the normal position of the vertically swinging member 3, be received in the upright conduit 13 and will pass through the outlet 14 of said conduit 13 into the bottom casing 1 and will pass from the casing 1 through the rear outlet spout 6 and to any appropriate point of discharge. It will also be understood that a portion of the water will pass through the screen 15 and into the pocket 18. The water will be retained in the pocket 18 by the valved aperture 19, and such of the water as passes through the aperture 19 will enter the casing 1 and pass from thence through the outlet spout 6, it being noticed in this connection that the aperture 19 is located in rear of the partition wall 8. When sufficient of the first run of water has accumulated in the pocket 18, the member 3 will swing against the action of the weight 10 so as to put the rear upright conduit 12 under and in registration with the intake conduit 5 whereupon the water will pass down through the upright conduit 12 to the longitudinal conduit 16 and will be discharged from the forward end of the said conduit 16 into the casing space in front of the partition wall 8 from whence the water will be conducted through the spout 7 to a cistern or other container. In passing through the conduit 16 the water will pass over the screen 17, and sediment will pass with some of the water through the interstices of the screen 17 and into the portion of the conduit 16 below the screen 17 from whence the water and the sediment therein will pass out through the aperture 21 in the lower part of the forward end wall of the conduit 16, which aperture 21 as will be readily understood will be at that time in communication with the interior of the casing 1 at a point in rear of the partition wall 8. From this it follows that when clear and pure water will be supplied to the outlet spout 7. In virtue of the screen 15 the water that enters the pocket 18 is cleared of foreign substance and sediment as is desirable.

By adjusting the valve plate 20 and thereby regulating the discharge aperture 19 of the pocket 18 the time at which the member 3 will swing downwardly may be predetermined so that when desired a considerable portion of the first run of rain water may be carried to a point of discharge before any of the rain water is conducted through the spout 7 to a cistern or other container.

It will be appreciated from the foregoing that notwithstanding the simplicity and compactness of my novel mechanism, the same is reliable in operation and entirely automatic in action.

The pocket 18 is preferably provided at 18ˣ with a removable cover so that when desired access can be readily gained to the interior of the said pocket 18.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. An automatic valve mechanism for the purpose described comprising a casing having an intake in its upper rear portion and discharges leading from the forward portion of its bottom wall and also having a transverse partition disposed between said discharges and recessed, and a vertically swinging member pivoted in the casing and weighted at its rear end and having a rear upright conduit open at its upper end, an upright conduit arranged immediately in front of said rear conduit, the outlet extending rearwardly from the second-named upright conduit and under the rear upright conduit and provided with a screen bottom, a longitudinal conduit open at its forward end and communicating at its rear end with the rear upright conduit, and a pocket arranged alongside of and under the longitudinal conduit and communication with the said screen bottom of said outlet; the said longitudinal conduit being adapted on gravitation of the forward portion of the vertically swinging member to discharge into the casing in front of said transverse partition in which the forward portion of the longitudinal conduit is vertically movable.

2. An automatic valve mechanism for the purpose described comprising a casing having an intake in its upper rear portion and discharges leading from the forward portion of its bottom wall and also having a transverse partition disposed between said discharges and recessed, and a vertically swinging member pivoted in the casing and weighted at its rear end and having a rear upright conduit open at its upper end, an upright conduit arranged immediately in front of said rear conduit, the outlet extending rearwardly from the second-named upright conduit and under the rear upright conduit and provided with a screen bottom, a longitudinal conduit open at its forward end and communicating at its rear end with the rear upright conduit, and a pocket arranged alongside of and under the longitudinal conduit and communicating with the said screen bottom of said outlet; the said longitudinal conduit being adapted on gravitation of the forward portion of the vertically swinging member to discharge into the casing in front of said transverse partition in which the forward portion of the longitudinal conduit is vertically movable, and the said longitudinal conduit being provided in its forward portion with a screen and being also provided in its forward portion below said screen with a comparatively small discharge aperture in communication with the casing at a point in rear of said transverse partition.

3. An automatic valve mechanism for the purpose described comprising a casing having an intake in its upper rear portion and discharges leading from the forward portion of its bottom wall and also having a transverse partition disposed between said discharges and recessed, and a vertically swinging member pivoted in the casing and weighted at its rear end and having a rear upright conduit open at its upper end, an upright conduit arranged immediately in front of said rear conduit, the outlet extending rearwardly from the second-named upright conduit and under the rear upright conduit and provided with a screen bottom, a longitudinal conduit open at its forward end and communicating at its rear end with the rear upright conduit, and a pocket arranged alongside of and under the longitudinal conduit and communicating with the said screen bottom of said outlet; the said longitudinal conduit being adapted on gravitation of the forward portion of the vertically swinging member to discharge into the casing in front of said transverse partition in which the forward portion of the longitudinal conduit is vertically movable, and the said pocket being provided in the forward portion of its bottom with a discharge aperture, and being also provided with means for regulating the size of said aperture.

4. In an automatic valve mechanism for the purpose described, the combination of a casing having an intake in its top near its rear end and also having discharges leading from its bottom near its forward end and further having a transverse partition disposed between the said discharges, and a vertically swinging member mounted in the casing and having two conduits for registration in succession with the intake, one of the said conduits of the vertically swinging member being arranged to discharge into the casing in rear of the said partition, and the other conduit being arranged on gravitation of the forward portion of the vertically swinging member to register with the intake and to effect connection between the same and the interior of the casing in front of the partition, and the said vertically swinging member also having a pocket adapted in the normal position of the vertically swinging member to receive water from the intake whereby on the first run of rain water the water received in the swinging member will bring about gravitation of the forward portion thereof.

In testimony whereof I affix my signature.

GUSTAV JOHNSON.